United States Patent
Inoue et al.

(10) Patent No.: US 9,239,813 B2
(45) Date of Patent: Jan. 19, 2016

(54) RING-PATTERN BUS CONNECTED INFORMATION PROCESSING APPARATUS, INFORMATION PROCESSING METHOD, AND STORAGE MEDIUM

(75) Inventors: Hirowo Inoue, Kawasaki (JP); Hisashi Ishikawa, Urayasu (JP)

(73) Assignee: Canon Kabushiki Kaisha, Tokyo (JP)

(*) Notice: Subject to any disclaimer, the term of this patent is extended or adjusted under 35 U.S.C. 154(b) by 1107 days.

(21) Appl. No.: 12/720,058

(22) Filed: Mar. 9, 2010

(65) Prior Publication Data
US 2010/0235609 A1    Sep. 16, 2010

(30) Foreign Application Priority Data
Mar. 13, 2009   (JP) .................................. 2009-060687

(51) Int. Cl.
*G06F 13/38* (2006.01)
*G06F 15/173* (2006.01)
*G06T 1/20* (2006.01)

(52) U.S. Cl.
CPC .......... *G06F 15/17375* (2013.01); *G06F 13/38* (2013.01); *G06T 1/20* (2013.01)

(58) Field of Classification Search
CPC ....................................................... G06F 13/38
See application file for complete search history.

(56) References Cited

U.S. PATENT DOCUMENTS

| | | | | |
|---|---|---|---|---|
| 4,872,125 A | * | 10/1989 | Catlin | ............................ 703/16 |
| 5,666,484 A | | 9/1997 | Orimo | |
| 6,496,516 B1 | * | 12/2002 | Dabecki et al. | ............... 370/460 |

FOREIGN PATENT DOCUMENTS

| | | |
|---|---|---|
| JP | 2522952 B2 | 8/1996 |
| JP | 2734246 B2 | 3/1998 |
| JP | 2834210 B2 | 12/1998 |
| JP | 11-215189 A | 8/1999 |
| JP | 2008-066971 A | 3/2008 |

* cited by examiner

*Primary Examiner* — John Lindlof
(74) *Attorney, Agent, or Firm* — Canon USA Inc. IP Division

(57) ABSTRACT

In an information apparatus including a plurality of processing circuits connected to a ring bus, when processing speeds (throughput) of processing circuits are different or an amount of data in the processing circuit is increased or decreased, deadlock can occur or the throughput can be decreased in the ring bus. In order to solve this problem, a stall state of other processing unit is detected from a packet acquired from the ring bus and a packet is restricted from being newly generated by the processing circuit nor transmitted therefrom when other processing unit is in the stall state.

39 Claims, 14 Drawing Sheets

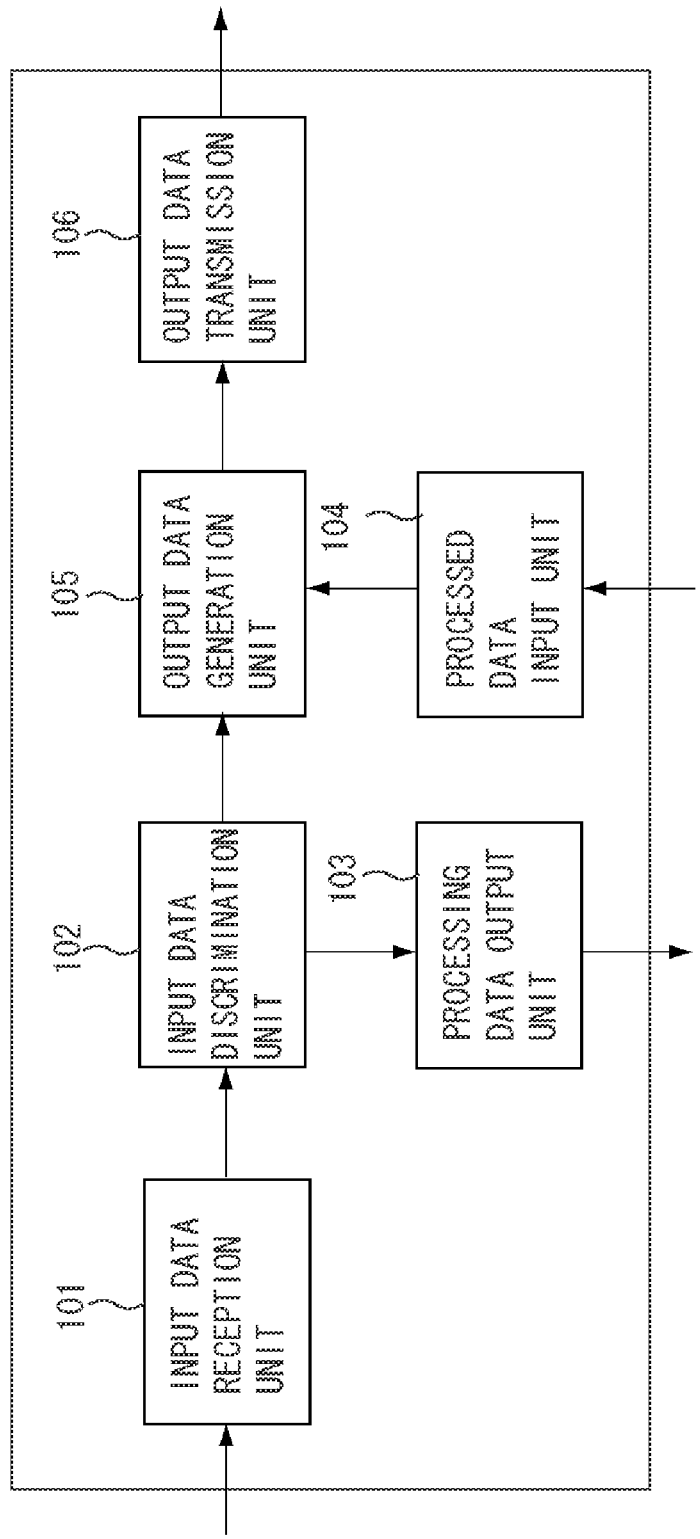

FIG. 2A

| 201 | 202 | 203 | 204 | 205 |
|---|---|---|---|---|
| Count | Valid | Stall | ID | DATA |

FIG. 2B

| 201 | 202 | 203 | 204 | 205 |
|---|---|---|---|---|
| Count | Valid | Stall | ID | COMMAND |

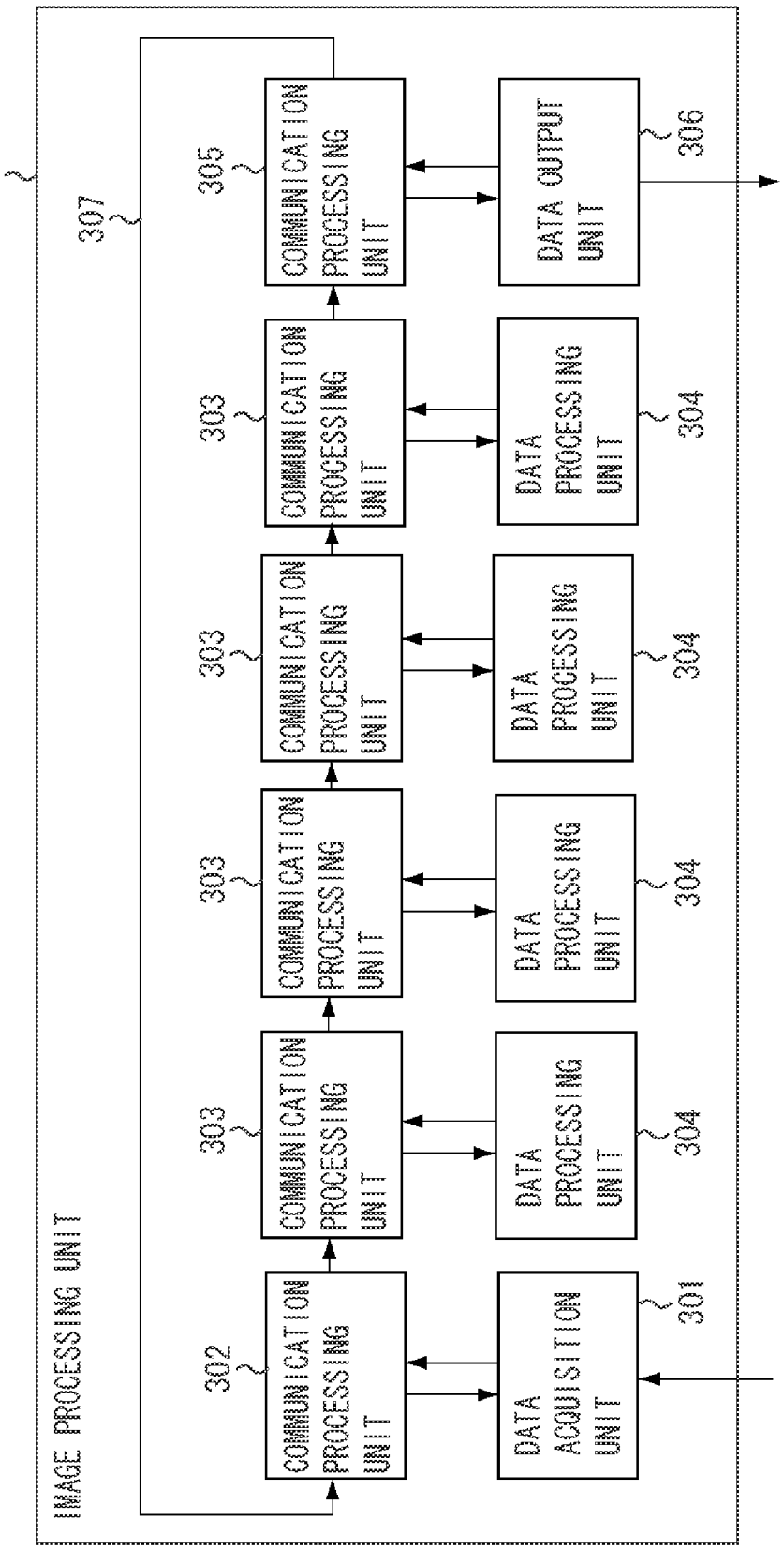

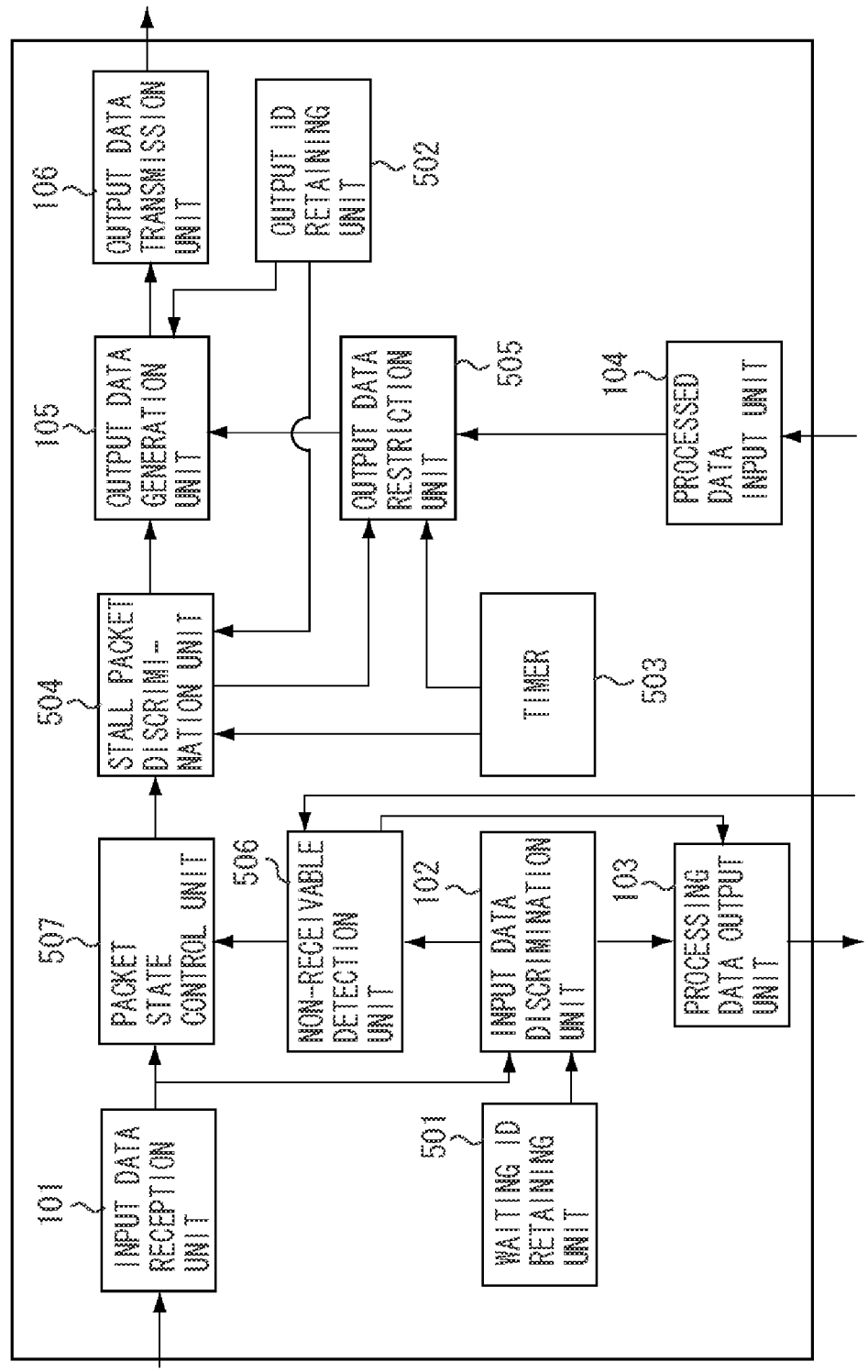

RING-PATTERN BUS CONNECTED INFORMATION PROCESSING APPARATUS, INFORMATION PROCESSING METHOD, AND STORAGE MEDIUM

BACKGROUND OF THE INVENTION

1. Field of the Invention

The present invention generally relates to information processing, and more particularly to an information processing apparatus in which a plurality of information processing units are connected to a ring-pattern bus, an information processing method for the information processing apparatus, and a storage medium storing a program thereof.

2. Description of the Related Art

A conventional method for efficiently processing information by performing in parallel processing circuits realized by a hardware uses pipe-line connection of a bus type as discussed in Japanese Patent Application Laid-Open No. 2734246.

According to this method, data, which is input from an external memory via an interface (I/F) at an input end, is sequentially processed according to an order in which a plurality of processing circuits are arranged and is output at an output end to an external memory. Therefore, a processing order is restricted by an order in which the processing circuits are connected when being mounted in the hardware, and cannot be changed.

There is a method for connecting the processing circuits with a ring-pattern bus (hereinafter, referred to as a ring bus) as discussed in Japanese Application Patent Laid-Open Nos. 2522952 and 2834210. Since the processing circuit is connected to the ring bus as a part of the hardware and thus has a fixed processing function, it has been difficult to freely realize a processing order different from a physical connection order of the processing circuit.

For example, a method is discussed for performing the processing while data is being received and transmitted between the plurality of processing circuits by using a communication system of a token passing method.

However, when the processing order different from the connection order is to be realized using such a data path, in the communication path configured in a ring pattern, the data circulating in the ring bus is increased due to a change of the order. As a result, data traffic in the ring bus is increased, thereby decreasing a processing performance and generating deadlocks.

SUMMARY OF THE INVENTION

The present invention is directed to an information processing apparatus capable of reducing an occupancy rate of packets, due to unprocessed data, in the ring bus when a plurality of processing units connected to a ring bus process information, and an information processing method.

According to an aspect of the present invention, an information processing apparatus including a plurality of processing units communicably connected to a ring bus and configured to process information in order, and a first processing unit, which is one of the plurality of processing units, and the apparatus includes a transmission unit configured to, when the first processing unit is in a first state where the first processing unit does not process information acquired from the ring bus, transmit to the ring bus a packet indicating that the first processing unit is in the first state, a detection unit configured to detect that a second processing unit, which is one of the plurality of processing units, is in the first state from a packet flowing in the ring bus, and a control unit configured to, when the second processing unit is detected to be in the first state, restrict a packet having data processed by the first processing unit from being output to the ring bus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a schematic block diagram illustrating a configuration of a communication processing unit.

FIGS. 2A and 2B illustrate formats of a packet.

FIG. 4 is a schematic block diagram illustrating a configuration of a communication processing unit.

DESCRIPTION OF THE EMBODIMENTS

Figure 3B:
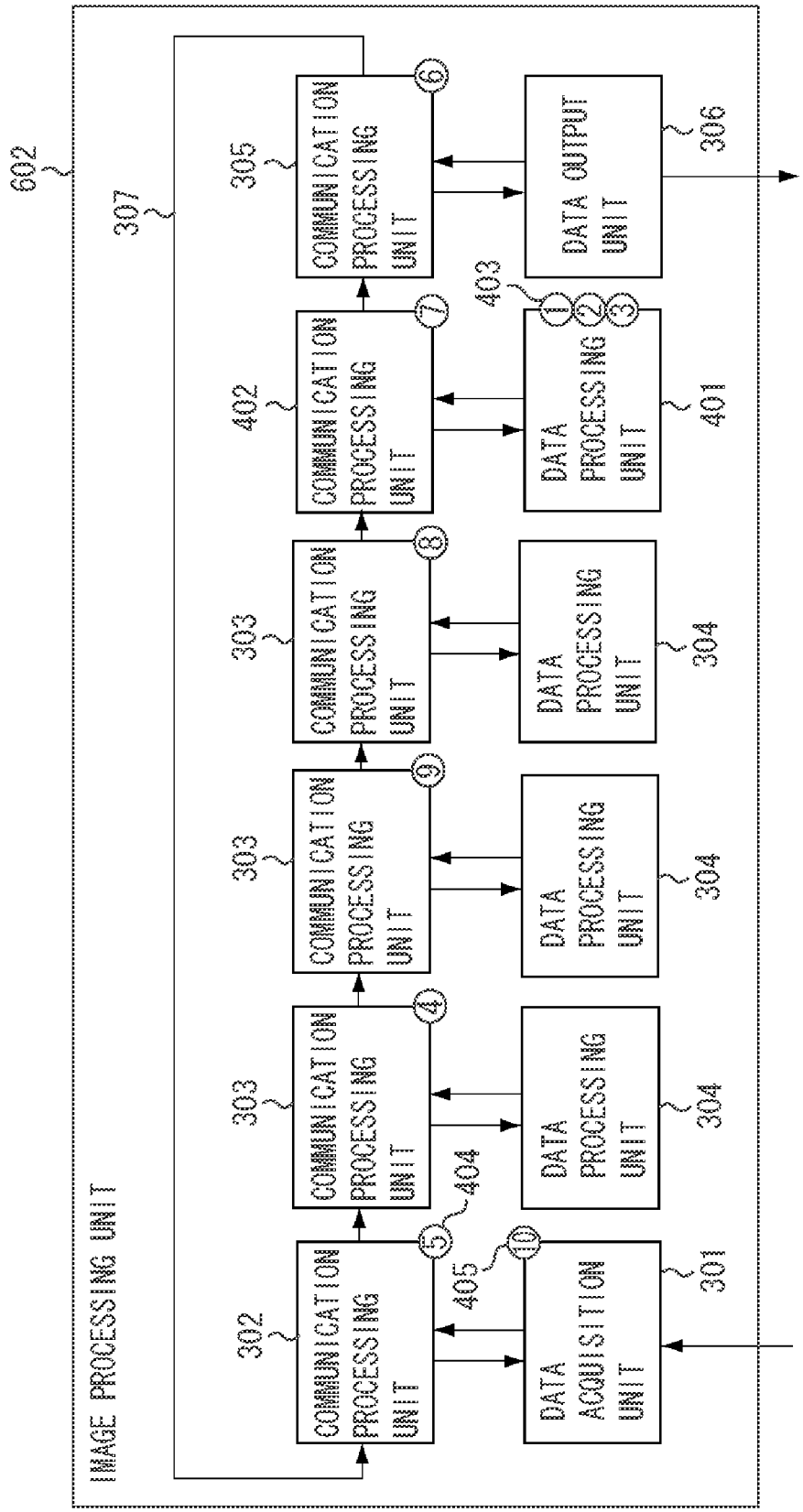
FIG. 3 is a schematic block diagram illustrating a configuration of an image processing unit including a plurality of processing units connected to a ring bus.

Various exemplary embodiments, features, and aspects of the invention will be described in detail below with reference to the drawings.

As a reference example, a state will be described in which packets are occupied by unprocessed data in the ring bus to cause deadlock.

FIG. 1 illustrates a configuration of a communication processing unit that connects an information processing unit (hereinafter, a data processing unit) to a communication path (bus). An input data reception unit 101 receives a data packet flowing in the ring bus.

An input data discrimination unit 102 confirms control information of an input data packet and discriminates whether the input data is to be processed by an own node of the input data discrimination unit 102.

A processing data output unit 103 transmits to the data processing unit the data determined by the input data discrimination unit 102 to be processed by the own node. A processed data input unit 104 receives an input data processed by the data processing unit of the own node.

An output data generation unit 105 generates output data from data determined by the input data discrimination unit 102 not to be processed by the own node, empty packet determined not to include valid data, and processed data which is input from the processed data input unit 104 and necessary to be output into the bus. An output data transmission unit 106 outputs the output data generated by the output data generation unit 105 to the ring bus.

FIGS. 2A and 2B illustrate data configurations of the packet transmitted/received to/from the ring bus in the communication processing unit described above.

A field 201 stores a counter value indicating the processing order of the data. A part of the data packets including sequential unprocessed data may occasionally circulate in the ring bus. Therefore, the data received by the communication processing unit is not always the data to be firstly processed by the corresponding data processing unit.

If such a counter is added to the data, the processing can be performed according to a correct processing order such as an input order. The corresponding data processing unit refers to the data processing unit with which the communication processing unit can directly communicate without using the ring bus.

A field 202 stores a flag indicating that the data retained by the data packet is the valid data to be processed. This flag has the same meaning as that of a flag indicating that the packet is currently in use. Hereinafter, the flag is referred to as a "valid bit".

A field 203 stores a flag indicating that the data retained by this packet is not received by the data processing unit that is due to process the data for some reasons. This flag has the same meaning as that of a data supply suspension request bit (disable signal) to a previous stage in a normal pipeline connection. Hereinafter, this flag is referred to as a "stall bit".

A field 204 stores an identification (ID) of the data processing unit that has lastly processed the data. The data communication processing unit compares awaiting ID previously set by an external unit with the ID of the data packet, and performs the processing when the IDs match with each other. Typically, the waiting ID is a value unique to each processing unit. A field 205 stores the data.

A total number of the packets flowing in the ring bus is substantially constant. More specifically, a sum of empty packets and valid packets is substantially constant, and thus the constant number of packets continuously circulates in the ring bus. The empty packet has the data determined to be invalid, and the valid packet has the data or the command.

FIG. 3A illustrates an example of a schematic configuration of the image processing unit.

A data acquisition unit 301 acquires the data to be processed from an external storage apparatus. A communication processing unit 302 for inputting data supplies the acquired data to the ring bus. A data processing unit 304 performs a predetermined processing on the supplied data.

When information is processed, usually, the processing unit is not set in a standalone state where the processing unit does not communicate with the external units. In the present exemplary embodiment, however, in order to describe communication processing to be performed by the processing unit in detail, the data processing unit and the communication processing unit are described independently from the processing unit.

A communication processing unit 303 selects and takes in the data to be processed by the data processing unit 303 from the communication path (i.e., ring bus). In this configuration, one or more processing units including the data processing unit 304 and the communication processing unit 303 are connected to a ring bus 307.

A communication processing unit 305 for outputting data selects and takes in the processed data from the ring bus to output the processed data to the external storage apparatus.

A data output unit 306 outputs the processed data taken in by the communication processing unit 305 to the external storage apparatus. The ring bus 307 communicably connects the communication processing units with each other described above.

The data acquisition unit 301 stores the data acquired from an external unit of an image processing unit 602, and the communication processing unit 302 for inputting data processes the data stored on the data acquisition unit 301 into a packet and supplies the packet data to the ring bus 307. In this case, the data extracted from the packet by the communication processing unit 305 may be supplied to the data output unit 306.

In addition, the data acquisition unit 301 may extract the data from the packet acquired from the external unit of the image processing unit, and the communication processing unit may convert the extracted data into a packet illustrated in FIG. 2. In this case, the data output unit 306 converts the data extracted by the communication processing unit into a packet to be output to the external unit of the image processing unit.

Further, when the data acquired by the data acquisition unit 301 has been already processed into a packet, as illustrated in FIG. 2, the communication processing unit 302 may use the packet as it is. In this case, the communication processing unit 302 does not generate the packet and the communication processing unit 305 does not need to extract the data from the packet.

FIG. 3B illustrates a state where deadlock is generated in the configuration illustrated in FIG. 3A. In order to indicate an order of the data, numbers indicating an input order of the data are illustrated in data 403, 404, and 405.

A data processing unit 401 simultaneously processes and outputs three sets of data. Since a communication processing unit 402 performs processing corresponding to the data processing unit 401, the communication processing unit 402 cannot output a processing result until the data processing unit 401 acquires the three pieces of data and completes the processing.

If the data acquisition unit 301 continuously supplies the data during the processing performed by the data processing unit 401, all packets circulating in the ring bus may be filled with input data. In this case, since no empty packet is left, the data 403 to be output from the data processing unit 401 is stuck in the communication processing unit 402 and cannot be output therefrom to the ring bus 307.

Further, the data processing unit 401 cannot perform following data processing until all the data processed thereby is output. In this case, the data processing unit 401 and the communication processing unit 402 cannot acquire following data since the processed data cannot be output. Furthermore, the data acquisition unit 301 stops an operation since the communication processing unit 302 cannot output the data to the ring bus 307.

Moreover, the data output unit 306 cannot output any data to an outside of the image processing unit since the processed data 403 to be output is not output from the data processing unit 401.

As described above, in the data processing apparatus in which the plurality of processing units are connected to the ring bus, unprocessed data can occupy all the packets in the ring bus, thereby causing a state where the data processing unit cannot acquire the following data and eventually generating a deadlock state.

In order to avoid such a deadlock state, a technique is discussed for deleting a packet circulating in the ring bus and generating an empty packet, when a data processing unit cannot receive input data (Japanese Patent 2834210). According to the technique illustrated in the Japanese Patent 2834210, however, the data supply unit needs to read the data again from the external storage apparatus of the processing apparatus to process the deleted data. Thus, a problem arises that processing takes time and control becomes complicated.

An exemplary embodiment of the present invention will be described below. A description of a similar configuration or a similar function to that in a reference example will not be repeated.

Figure 5:
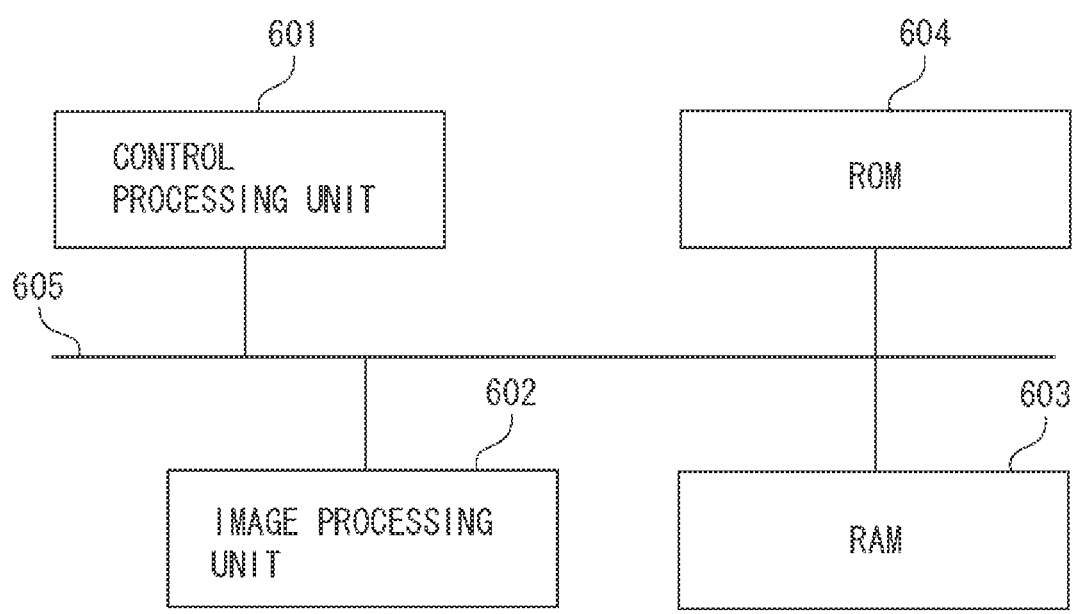
FIG. 5 is a schematic block diagram illustrating a configuration of the image processing unit.

FIG. 5 illustrates a schematic configuration of a system of the present exemplary embodiment. A control processing unit 601 is a processing circuit, such as a central processing unit (CPU), a micro processing unit (MPU), or the like. An image processing unit 602 includes a plurality of processing units connected with each other via the ring bus.

A random access memory (RAM) 603 is a readable and writable memory for storing input image data before being processed, output image data after being processed, or data for setting parameter of the image processing unit 602. A read only memory (ROM) 604 is a readable memory capable of storing a processing procedure performed by the control processing unit 601, the image processing unit 602, and a constant for setting a parameter.

The control processing unit 601 controls the system and instructs the image processing unit 602 according to a program read from the ROM 604.

The image processing unit 602 performs image processing according to an instruction from the control processing unit 601. In this case, the image processing unit 602 reads input image data previously stored in the RAM 603 to perform the processing, and then writes back a processing result into the RAM 603.

A system bus 605 communicably connects the control processing unit 601, the image processing unit 602, the RAM 603, and the ROM 604 with each other.

Figure 6:
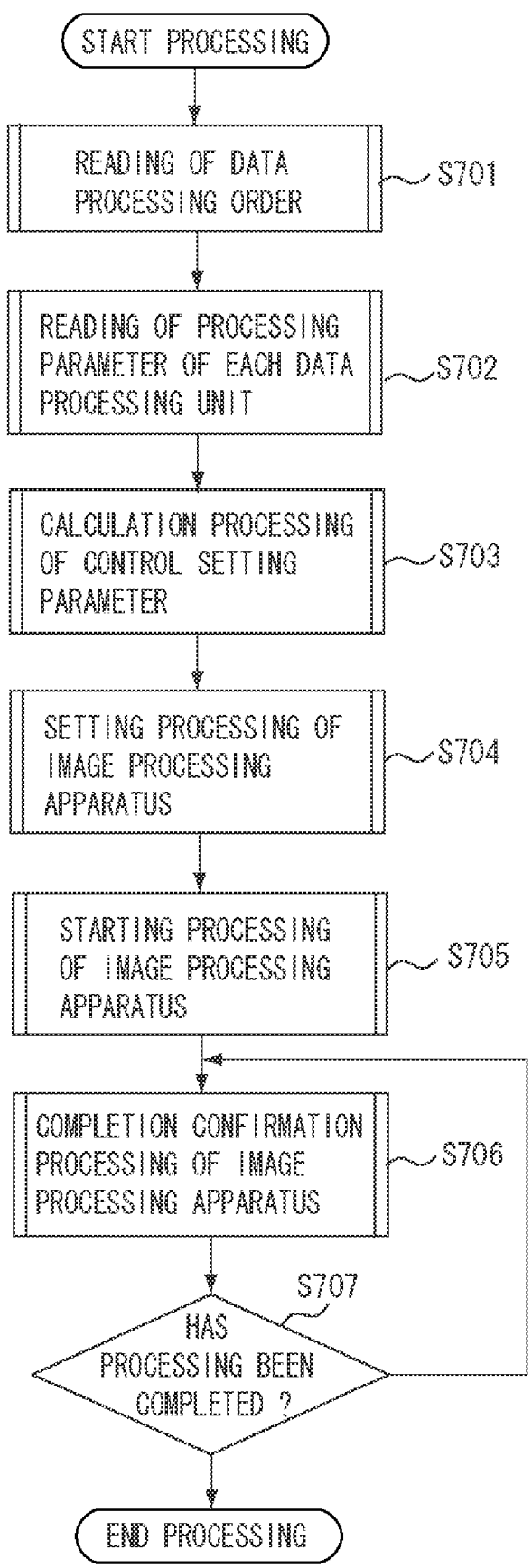
FIG. 6 is a flowchart illustrating processing for setting the image processing unit by a control processing unit.

FIG. 6 illustrates a flow of processing for setting the image processing unit 602 performed by the control processing unit 601.

When image processing control is started, the processing is performed according to steps described below. In step S701, the control processing unit 601 reads from the ROM 604 an order of the processing to be performed by the data processing unit in the image processing unit 602.

In step S702, the control processing unit 601 reads a processing parameter to be given from the ROM 604 to the data processing unit. In step S703, the control processing unit 601 calculates a parameter for controlling the image processing unit 602 using the data processing order and the processing parameter that are read out.

In step S704, the control processing unit 601 sets the image processing unit 602 by using the control parameter calculated in step S703. In step S705, the control processing unit 601 instructs the image processing unit 602 to start the processing.

In step S706, the control processing unit 601 confirms that the image processing unit 602 has been set. In step S707, when setting is determined to be completed (YES in step S707), the processing ends. When the setting is not completed (NO in step S707), the processing returns to step S706 and continues to confirm completion of the processing.

Figure 7:
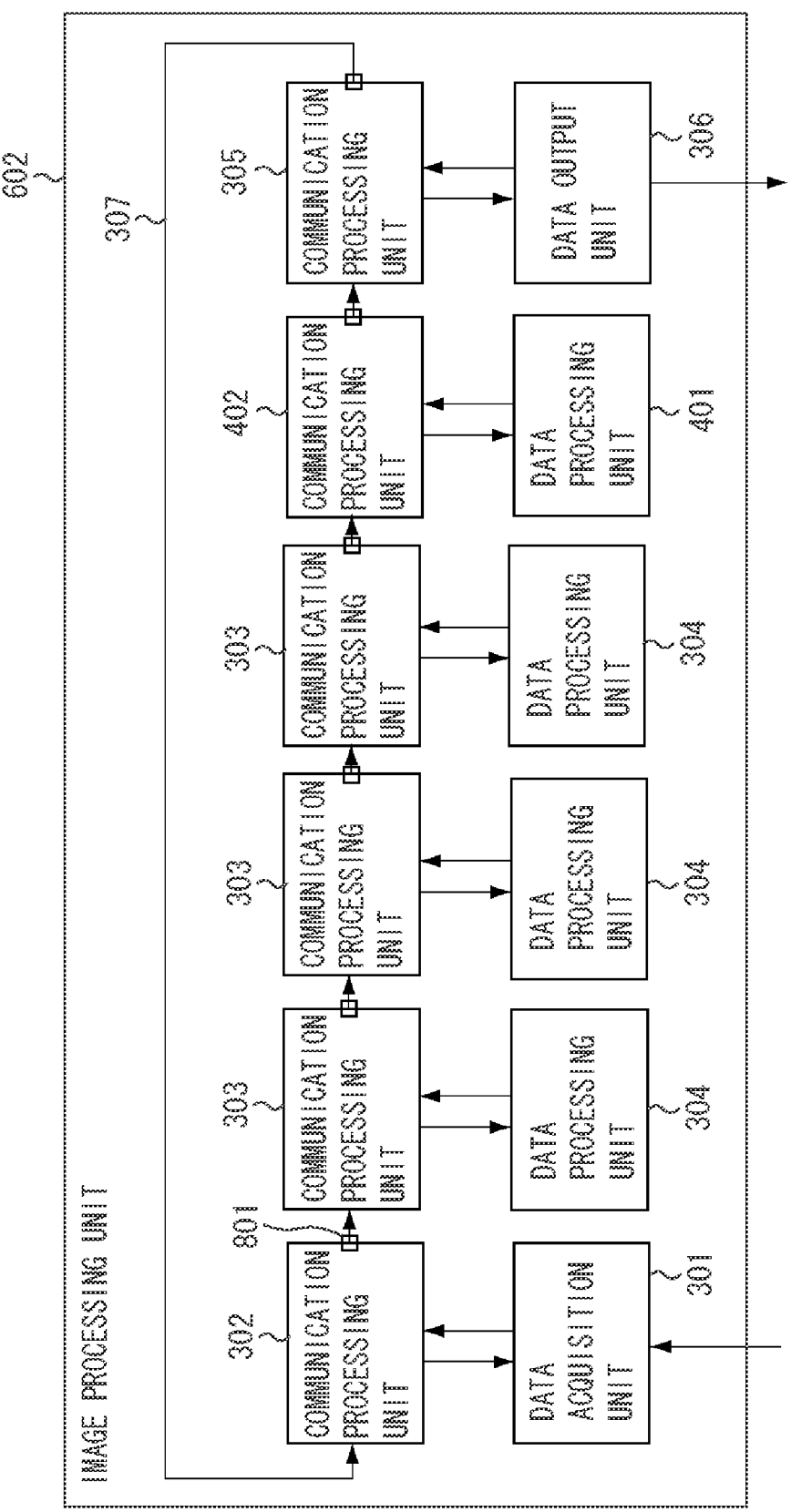
FIG. 7 is a schematic block diagram illustrating a configuration of the image processing unit.

FIG. 7 illustrates a configuration of the image processing unit 602 of the present exemplary embodiment. According to the present exemplary embodiment, as illustrated in FIG. 7, the units are pipeline connected with each other so that modules including the communication processing unit and the data processing unit can be performed in parallel. Further, a top end of the modules is connected with a bottom end thereof to be constituted in a ring pattern.

In the ring bus, as illustrated by a packet 801, a limited number of conceptional packets retaining data exist in the communication path. The packet 801 stores the data to be processed and circulates in a single direction to transmit the data to a desired data processing unit.

According to the present exemplary embodiment, the packet 801 including data is constituted as illustrated in FIG. 2. Further, as a unit for retaining the packet, each communication processing unit, for example, includes a shift register (not illustrated).

Each communication processing unit compares the ID (first ID) previously set to the register, which is retained thereby with the ID attached to the data in the packet (second ID). When the IDs are identical, the communication processing unit takes in the data of the packet. Subsequently, the data processing unit processes the data of the packet. The processed data is transmitted from the data processing unit to the communication processing unit.

The communication processing unit stores the processed data and a new ID in the empty packet retaining no data and outputs the data to the bus. Each data processing unit performs such processing to perform the data processing in an intended order.

The communication processing unit determines whether the packet is empty according to the valid bit illustrated by the field 202 in FIG. 2A. For example, the communication processing unit enables the packet to store "1" defined as a third bit as the valid bit when outputting the valid data.

On the other hand, when the valid data is received and processed, "0" is stored as the valid bit to empty the packet to reuse.

In the present exemplary embodiment, one of the processing units to perform the data processing is defined as a first processing unit, and other processing units (second processing units) are detected not to be in processing.

FIG. 4 is a block diagram illustrating a configuration of each communication processing unit connected to the ring bus of the present exemplary embodiment. A similar configuration or a similar function has a same reference numeral as that illustrated in FIG. 1, and description thereof will not be repeated.

A waiting ID retaining unit 501 stores the ID of the packet to be processed by the processing unit corresponding to each communication processing unit. When the processed data is written into the packet, an output ID retaining unit 502 retains the ID to be written with the processed data.

The waiting ID retaining unit 501 and the output ID retaining unit 502 each include at least one register so that the waiting ID retaining unit 501 can retain at least one waiting ID and the output ID retaining unit 502 can retain at least one output ID.

A timer 503 counts a predetermined cycle. A stall packet discrimination unit 504 determines whether the packet is in a stall state (first state) or not in the stall state (second state) according to the stall bit indicated by the field 203 in FIGS. 2A and 2B.

A unit time measured by the timer 503 may be a clock of the ring bus, a clock of the processing unit, or a unit time when a packet moves between the processing units, so long as each processing unit can use the unit time in common.

Additionally, a timer may be used that measures a time based on a clock independent from the ring bus and the processing unit. When a timer for measuring a time is used, if a speed of a clock of an operation of the ring bus and the processing unit is doubled, the time when a packet circulates is halved in theory.

The stall packet discrimination unit 504 determines that the packet is in the stall state when "1" defined as a first bit is stored as the stall bit and that the packet is not in the stall state when "0" defined as a second bit is stored.

The stall packet discrimination unit 504 discriminates the packet, which is determined to be valid according to the valid bit and has the stall bit of "1" and a same ID as that retained by the output ID retaining unit 502.

More specifically, the packet having "Valid=1", "Stall=1" and an ID the same as that stored by the register of the output ID retaining unit 502 is discriminated as a stall packet.

When the stall packet discrimination unit 504 discriminates the stall packet, an output data restriction unit 505 controls to restrict the data from being output to the ring bus from the processed data input unit 104 only for a predetermined period.

A non-receivable detection unit 506 determines that the data cannot be received when the data processing unit cannot receive following data although the input data discrimination unit 102 determines that the packet is to be received.

When a packet state control unit 507 is notified by the non-receivable detection unit 506 that the data cannot be received, the packet state control unit 507 changes the stall bit of the input data to "1", which indicates the stall state, and flows out the data to an output side. Further, when the non-receivable detection unit 506 determines that the data cannot be received, the packet state control unit 507 controls the processing data output unit 103 not to supply the data to the corresponding data processing unit.

The IDs retained by the registers of the waiting ID retaining unit 501 and the output ID retaining unit 502 are set by a control processing unit 601 in the processing illustrated in FIG. 6. An image processing unit 602 of the present exemplary embodiment sets the waiting ID and the output ID to constitute a data flow of pipeline processing.

Further, this method can change the ID of the register of the waiting ID retaining unit to switch the data processing unit from which the data is received other than the corresponding data processing unit.

As described above, in order to reduce the traffic in the ring bus without getting the data flow stuck therein, the output data restriction unit 505 restricts the packets from being newly output by the processing performed by each processing unit.

Processing performed by the data processing unit generating the stall will now be described.

The input data reception unit 101 receives the packet data from the ring bus. The input data discrimination unit 102 compares the ID of the received packet with the ID retained by the waiting ID retaining unit 501. By comparing the IDs, it is determined whether the received data is the data to be processed by the corresponding data processing unit.

When the input data discrimination unit 102 determines the data to be processed, the non-receivable detection unit 506 determines whether the corresponding data processing unit can receive the data.

When it is determined that the corresponding data processing unit cannot receive the data, the processing data output unit 103 restricts the data from being supplied to the data processing unit. Further, the packet state control unit 507 changes the stall bit of the received data to "1", which indicates the stall state.

As described above, the data that is received by the communication processing unit but cannot be processed by the data processing unit is given the stall bit "1" and output from the output data transmission unit 106 to the ring bus, and circulates therein.

In this case, the packet having the stall bit "1", which indicates the stall state, keeps retaining ID of a transmission source without changing ID information stored in the field 204. Accordingly, since the ID data of the packet is different from the output ID retained by the stall packet discrimination unit 504, the stall packet discrimination unit 504 in the communication processing unit which changes the stall bit of the packet to "1" does not detect the packet as the stall packet.

When the valid bit of the data packet flowing in the ring bus is "1", the output data generation unit 105 determines that the packet is not empty and thus does not write a data processing result therein.

Further, when the non-receivable detection unit 506 determines that the data can be received, the processing data output unit 103 transmits the extracted data from the packet to the data processing unit. Furthermore, the packet state control unit 507 changes the valid bit of the data packet to "0" to empty the packet (i.e., invalid).

A method will be described where each communication processing unit processes the data whose stall bit is set to "1", which indicates the stall state. Since the data having the stall bit "1" circulates in the ring bus, the data eventually reaches the transmission source.

When the stall packet discrimination unit 504 detects the stall packet, the stall packet discrimination unit 504 notifies the output data restriction unit 505 of the detection. The stall packet discrimination unit 504 may notify the output data restriction unit 505 immediately after finding the stall packet, or in a following period thereafter. This period is counted by the timer 503.

The output data restriction unit 505 may restrict the data from being output only in a predetermined period after receiving the notification, in a period when receiving the notification, or in a next timer period after receiving the notification.

A method for discriminating the stall packet will be described in detail. According to the conventional technique, an ID written into the packet with the data is an ID of the data processing apparatus which performs following processing. This is similar to a case, for example, where an IP address of a destination is attached to the data packet and transmitted in the network.

According to the present exemplary embodiment, the ID stored with the data in the packet is the ID of the transmission source that has processed the data retained in the output ID retaining unit 502. Since the ID stored in the packet is the ID of the transmission source, the data having the stall bit "1" is efficiently discriminated in the data processing unit that is a destination of the data.

Figure 8:
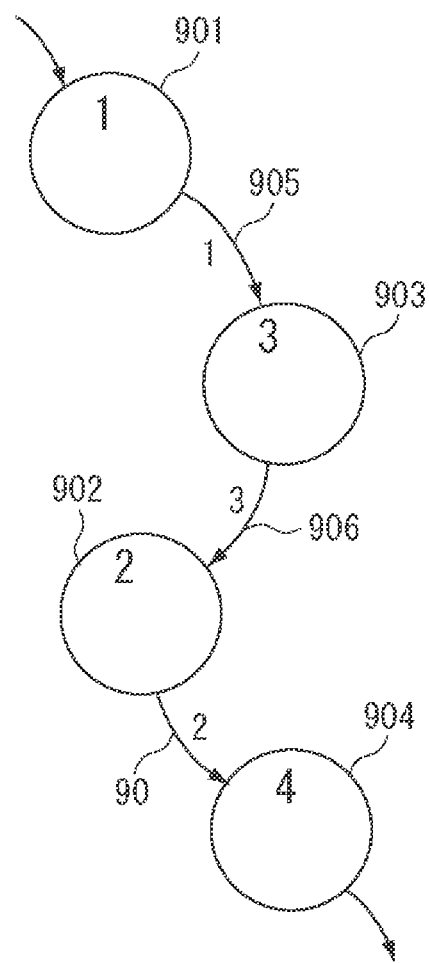
FIG. 8 is an example of schematic data flow of an exemplary embodiment of the present invention.

FIG. 8 illustrates an example of a data flow of the pipeline processing. Each circle indicates a node that processes the data. An arrow schematically illustrates that the data is transmitted from a node to another node. A numeral attached to the arrow is the ID of the transmission source to be attached to the data.

A point 901 is a node "1", which firstly processes the data. A point 902 is a node "2", which receives data as a result of processing 906 performed by a node "3" indicated by a point 903 and performs processing.

The point 903 is a node "3", which receives data as a result of processing 905 performed by the node "1" indicated by the point 901 and performs processing. A point 904 is a node "4", which receives data as a result of processing 90 performed by the node "2" indicated by the point 902 and performs processing.

An operation will be described below when such pipeline processing is realized by a plurality of processing units connected to the ring bus of the present exemplary embodiment.

Figure 9A:
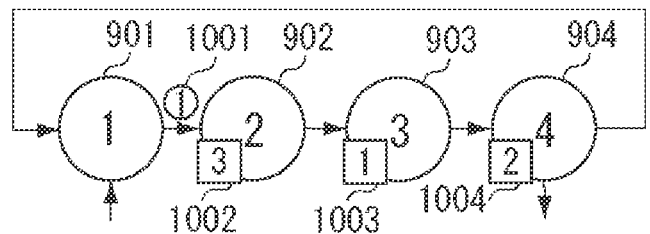
FIGS. 9A, 9B, 9C, 9D, 9E, 9F, 9G, 9H, 9I, 9J, and 9K illustrate examples of operations of the image processing apparatus according to the exemplary embodiment of the present invention.

As illustrated in FIG. 9A, a processing unit 901 corresponding to the node "1" writes a node ID "1" thereof together with the data to a packet 1001 and outputs the packet 1001.

FIGS. 9A, 9B, 9C, 9D, 9E, 9F, 9G, 9H, 9I, 9J, and 9K illustrate packets 1001, 1002, 1003, 1004, 1005, 1006, and 1007 having the data by using a notation different from that of FIG. 3B. Each of the packets 403, 404, and 405 indicating the data includes a numeral value indicating an order for inputting the data. The numerals attached to the packets in FIG. 9A, 9B, 9C, 9D, 9E, 9F, 9G, 9H, 9I, 9J, and 9K indicate the IDs of the transmission sources attached to the packets. The processing for constituting the data flow using the ID will be described.

Figure 9B:
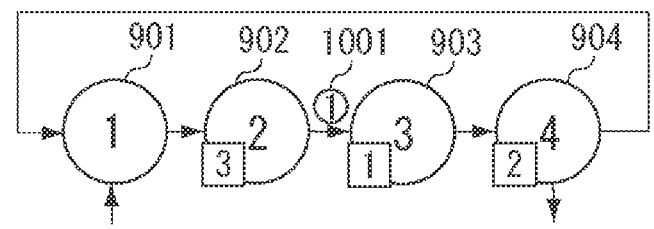

As illustrated in FIG. 9B, since the data 1001 output from the processing unit 901 illustrated in FIG. 9A retains an ID different from an ID=3 for which the node "2" is waiting, the data 1001 passes through a processing unit 902 (the node "2").

Figure 9C:
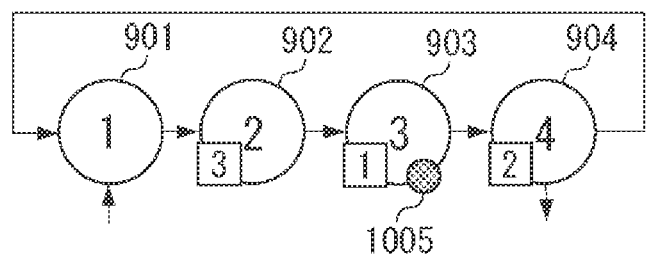

In FIG. 9C, a processing unit 903, which is the node "3", receives the packet 1001 having an ID same as the waiting ID that has been previously set. The processing unit 903 processes data 1005 attached to the packet 1001 as the data to be processed.

Figure 9D:
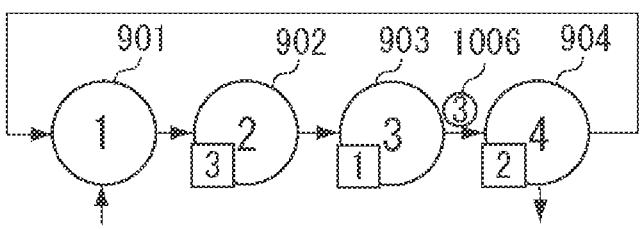
Figure 9E:
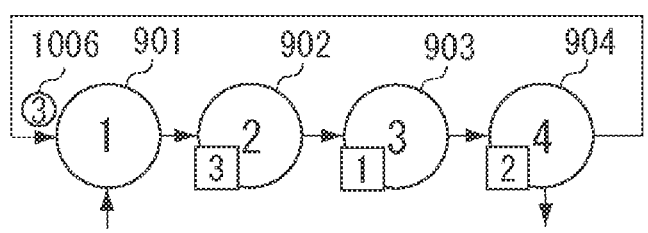
Figure 9F:
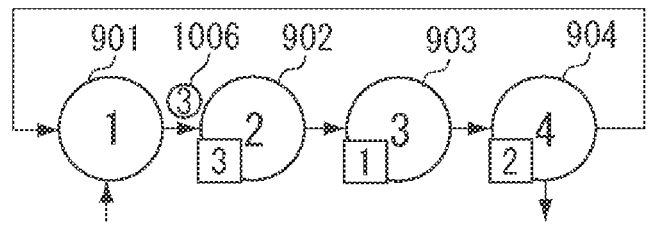

As illustrated by a packet 1006 in FIG. 9D, the node "3" attaches the processed data and an ID of the node "3" to the packet and outputs the packet again to the ring bus. In FIG. 9E, since a processing unit 904, which is the node "4", waits for the data having an ID "2", the packet 1006 passes through the node "4".

Further, since the processing unit 901, which is the node "1", supplies the data and thus does not receive the processing result in the ring bus, the processing unit 901 does not have the previously-set waiting ID. Accordingly, in FIG. 9F, the packet 1006 passes through the node "1" too.

Figure 9G:
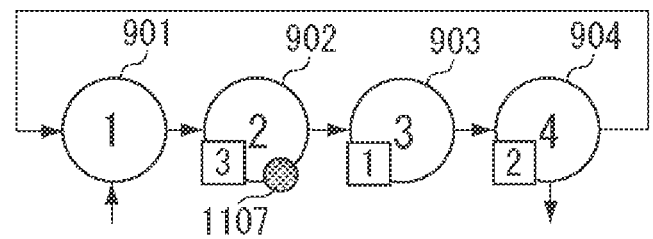

In FIG. 9G, the node "2", which has been previously set to wait for the data having the ID "3", extracts data 1007 from the packet 1006 and starts the processing. The data 1007 is being processed after being taken in by the node "2".

Figure 9H:
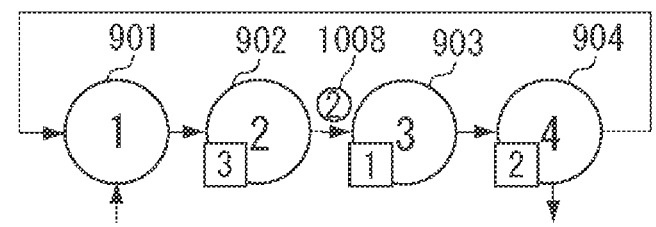

FIG. 9H illustrates a state where the data 1007 processed by the node "2" is attached to a packet 1008 together with the ID "2" of the node "2", which has performed the processing, and is output to the ring bus.

Figure 9I:
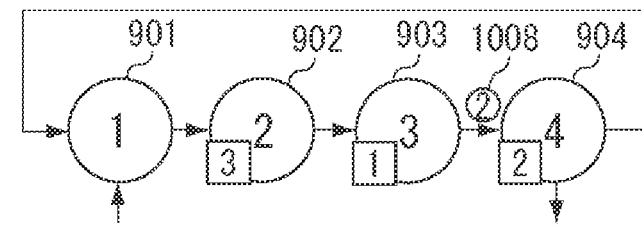

FIG. 9I illustrates a state where the data 1008 having the ID "2" passes through the node "3" waiting for a packet having the ID "1" and proceeds to a next node.

Figure 9J:
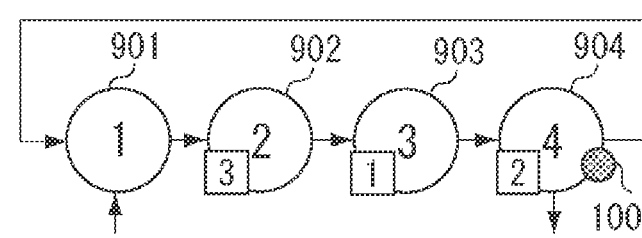
Figure 9K:
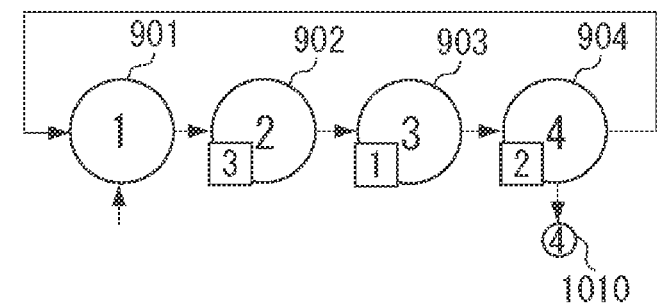

FIG. 9J illustrates a state where data 1009 is extracted from the packet 1008 by the node "4" waiting for the packet having the ID "2" and the processing is started. FIG. 9K illustrates a state where the data processed by the node "4" and an ID "4" of the node "4" are attached to a packet 1010 and output.

FIGS. 9A, 9B, 9C, 9D, 9E, 9F, 9G, 9H, 9I, 9J, and 9K mainly illustrate the valid packets, but actually invalid packets from which the data has been extracted and become invalid basically circulate in the ring bus without overtaking other packet.

FIGS. 10A, 10B, 10C, 10D, 10E, 10F, and 10G illustrate generation and transmission of the stall in the ring bus of the present exemplary embodiment.

Figure 10A:
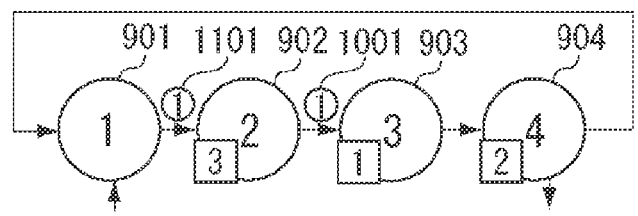
FIGS. 10A, 10B, 10C, 10D, 10E, 10F, and 10G illustrate example operations of the information processing apparatus of the exemplary embodiment of the present invention.
Figure 10B:
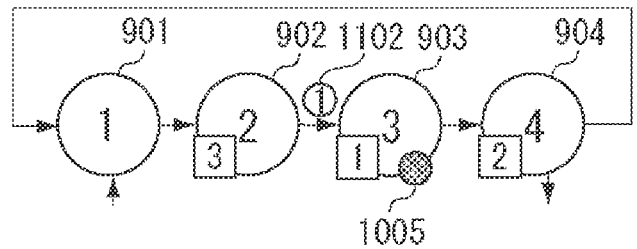

FIG. 10A illustrates a state where the node "1" continuously outputs the packet 1001 and a packet 1101. In this case, as illustrated in FIG. 10B, since following data comes while the node "3" is performing the processing, the node "3" cannot take in a received packet 1102.

Figure 10C:
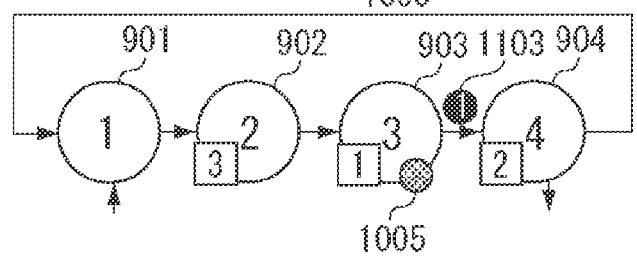

Therefore, as illustrated in FIG. 10C, the node "3" gives the stall bit "1" to the packet 1102 that has been received by the node "3" and outputs the packet 1102 as a packet 1103, which circulates in the ring bus.

If the above-described stall is generated in a plurality of nodes, in addition to the data packet having no stall bit, the data packet having the stall bit "1" circulates in the ring bus. An increasing number of the nodes that processes the data can also increase the number of the data packets having the stall bit "1".

The ring bus filled with the packets in a stall state can cause the deadlock or greatly decrease a processing performance. If the data packet in the stall state is detected and an increase of the data packets having the stall bit is suppressed, a more efficient data flow can be realized.

Figure 10D:
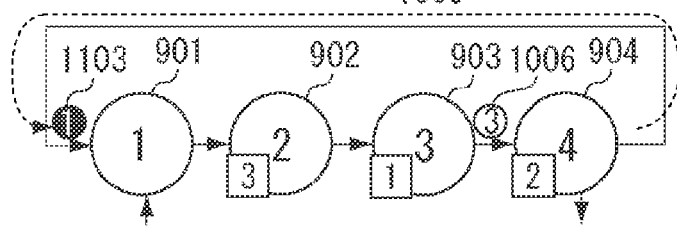

As illustrated in FIG. 10D, the packet 1103 having the stall bit "1" circulates in the ring bus with the ID of the node "1", which transmits the packet 1103, retained and returns to the node "1". At this point, the node "1" compares the ID thereof with the ID attached to the packet 1103 to confirm that the IDs are identical, and further checks the stall bit and the valid bit of the packet 1103.

By this processing, a certain node can detect that the data flown thereby is not processed by other node, more specifically, the other node to which the processing is assigned immediately after the certain node is in a state where the data cannot be received.

A period since the data has been transmitted from the node "1" until returning to the node "1" after circulating in the ring bus without being received by other node can be determined by the number of the nodes configuring the ring bus. Accordingly, a predetermined period of a packet for circulating in a ring bus may be equal to the number of the nodes configuring the ring bus or may be close to an integer (double or more, or halve or less) multiple of the period.

Since the processing on the stall bit may take a time at each node, a time for processing the stall bit may be added to a time needed for the packet to circulate.

The time for processing the stall bit is added for a first one circle and is not added for later than a second circle. When the number of the registers is largely different depending on each node, instead of using the number of nodes to calculate the period, a total number of nodes may be used to calculate the period.

If a state where the data cannot be processed by the node "3" occurs in the data flow illustrated in FIG. 8, the node "1" needs to restrict the data from being output. The node "1" detects the state to restrict the data from being output by unprocessed data, which has the stall bit "1", has been transmitted by the node "1" itself, and returned thereto.

More specifically, the ID of the node "1", which is the transmission source, is input to the data packet so that the node "1" can easily know that any other node has not processed the output from the node "1".

This method for detecting the stall can be applied to various data flows between the nodes connected by the ring bus. And, the method can be similarly applied to between the nodes "2" and "3", which are middle processing stages, except for the node "4", which is a last output stage.

If other node performs processing in a latter stage of the node "4" by specifying other order for processing data, the system can be similarly applied.

Figure 10E:
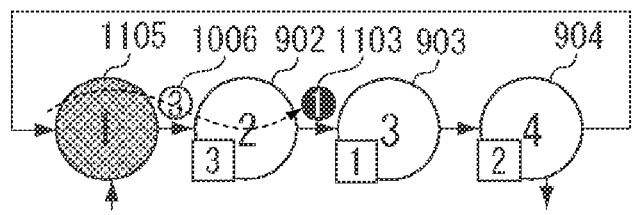

As described above, when the node "1" detects the stall, the node "1" restricts the following data from being output. In FIG. 10E, a processing unit 1105, which is the node "1", outputs a packet 1103 having a stall bit "1" to the ring bus and the packet 1103 directly reaches the node "3".

Figure 10F:
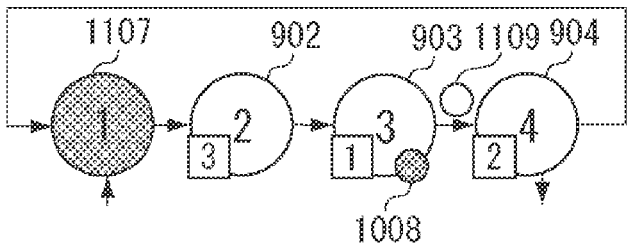

If the node "3" has already completed the processing and can receive the following data, as illustrated in FIG. 10F, the node "3" extracts the data of a packet 1106 and starts the processing. Data 1108 indicates the data taken in by the node "3".

At this point, the valid bit of the packet 1106 is set to "1", or, when the node "3" retains the output data, the packet 1106 is output with the output data being stored therein.

Figure 10G:
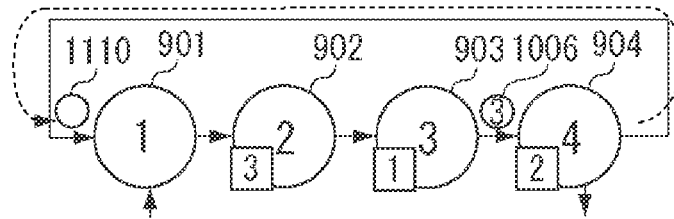

Similarly to the packet 1103, which has passed through the node "3", the packet 1106 circulates in the ring bus and eventually reaches the node "1". FIG. 10G illustrates a state where one period of time has elapsed since the packet in the stall state has passed through the node "1" in FIG. 10D.

According to the method described above, the node "1" does not detect whether the packet transmitted by the node "1" itself has been processed until one period of time elapses. The node "1" once having detected that the output data is in the stall state restricts the data, which has been processed by the node "1" itself, from being output during a period of time (hereinafter, referred to as one cycle time) when the packet makes a circuit of the ring bus.

Other node connected to a single ring bus can similarly control detection of the processing disable state described above and restriction of the output.

Further, in the stall packet discrimination unit 504 illustrated in FIG. 4, instead of comparison of IDs, the stall packet may be detected by confirming the valid bit and the stall bit. With this detection, the stall state of the data packet transmitted by other node can be also detected. Thus, an occupancy rate of the packets in the entire ring bus can be reduced.

As described above, according to the present exemplary embodiment, when other processing unit is in the stall state, each processing unit restricts the new processing of the data into the packet, and the transmission of the packet in order to reduce the occupancy rate in the ring bus and the deadlock.

Further, according to the present exemplary embodiment, each processing unit does not restrict transmission of the empty packet or the valid packet to be processed by other processing unit. Thus, the data flow in the ring bus can prevent the stagnation of the data flow, thereby reducing the traffic in the ring bus.

Furthermore, according to the present exemplary embodiment, since the information that has already reached the destination and cannot be processed by the processing unit of the destination continues to circulate in the ring bus, the processing for re-transmitting the information is not needed.

In the above description, only a case where the data packet illustrated in FIG. 2A is used is described, however actually, the command packet illustrated in FIG. 2B may be also used together. The command packet stores a command (command 205) to each processing unit, which performs the processing according to the command.

A parameter for each processing unit may be set according to the command packet. Using the command packet allows the data and the command to flow conceptually in one ring bus and the effects described above to obtain. Accordingly, since a signal line for transmitting a disable signal is not necessary, the effective data flow can be realized with the circuit reduced in size.

Figure 11:
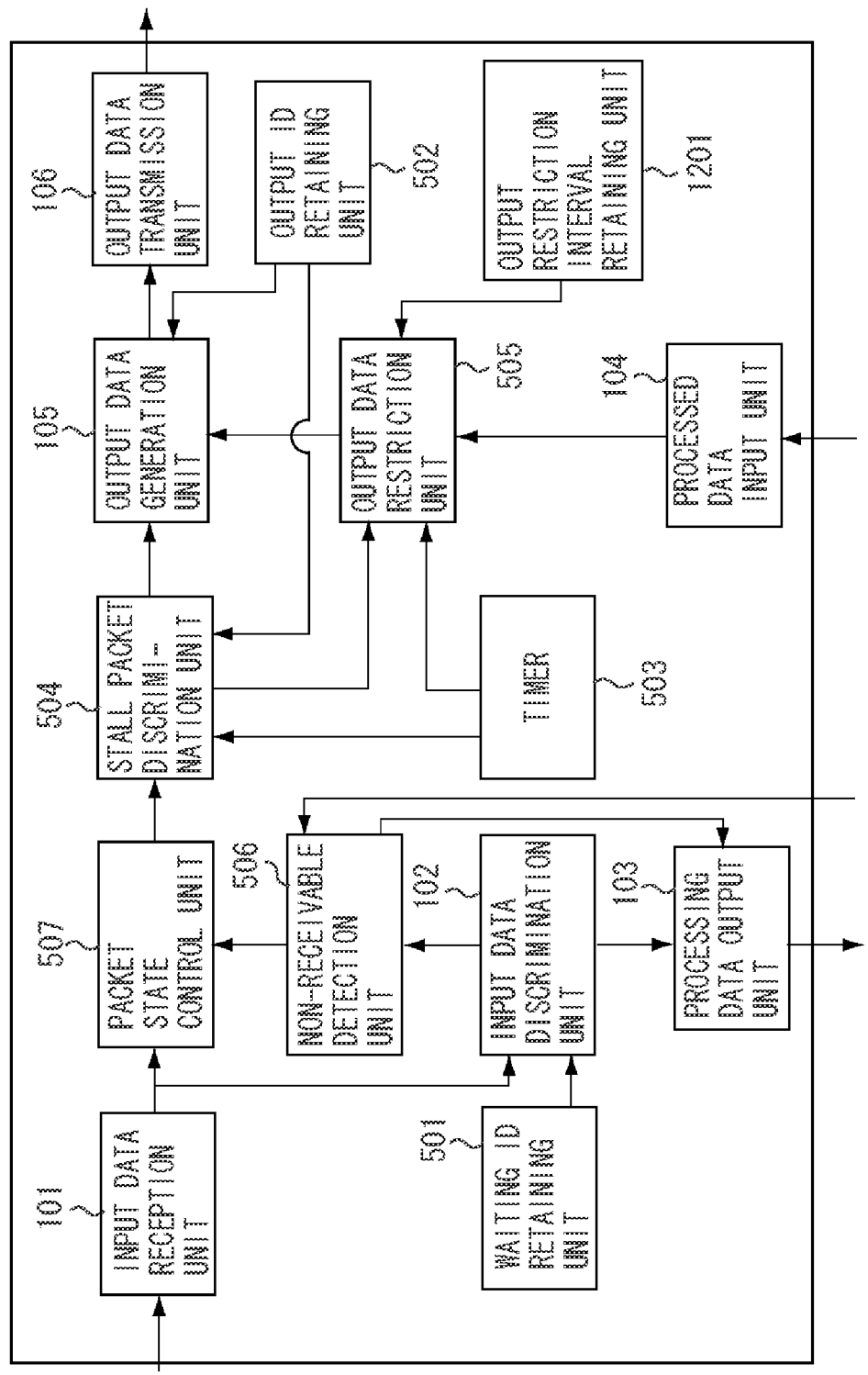
FIG. 11 is a schematic block diagram illustrating a configuration of the communication processing unit.

FIG. 11 illustrates a schematic configuration of another embodiment of the communication processing unit. A similar configuration to that of the communication processing unit illustrated in FIG. 4 has a same reference numeral, and description thereof will not be repeated.

In addition to the configuration of FIG. 4, this configuration includes an output restriction time retaining unit 1201 for retaining an output restriction time specified by an external device. An output data restriction unit 505 restricts the output during the time period retained by the output restriction time retaining unit 1201 when the output data restriction unit 505 is notified by the stall packet discrimination unit 504.

By performing such setting control from the external device, information about a processing disable time in the processing by the latter stage can be effectively utilized. Further, when the processing by the latter stage turns to a processing enable state, the processing can be controlled to instantly receive the following data. With this arrangement, it is possible to reduce deterioration of a processing speed performance caused by waiting for the processing data, which is a basic element of a processor of the data driving type.

When the data reception disable time by the node "3" illustrated in FIGS. 10A, 10B, 10C, 10D, 10E, 10F, and 10G is shorter than one cycle time, if the data output is restricted only for one cycle time after the stall has been detected, the restriction is not efficiently performed.

For example, as illustrated in FIGS. 10C and 10D, the node "3" outputs the data 1006 with a next timing after outputting the packet 1103 for which the stall bit is set and is in the reception enable state. In such a case, if the output is restricted for one cycle after the stall is detected, the node "3", which can perform the following processing, is kept in the waiting state.

For the processor of the data driving type, the processing performance largely depends on how steadily the data is supplied to the data processing unit without interruption as well as the processing speed of the data processing unit. Accordingly, in such a case, the performance can be further increased by supplying the following data with an earlier timing.

Thus, after the stall has been detected, the output may be controlled to be restricted only for a time less than the predetermined one cycle time.

On the other hand, when the data reception disable time of the node "3" illustrated in FIGS. 10A, 10B, 10C, 10D, 10E, 10F, and 10G is longer than the one cycle time, if the data output is restricted for the one cycle time after the stall has been detected, the restriction may be insufficient.

Thus, considering such a case, the output restriction interval retaining unit may be previously set in such a manner that the output is restricted for a longer time period than the one cycle time after the stall has been detected.

As described above, the communication processing unit illustrated in FIG. 4 can make it possible with a simple configuration to reduce the deterioration of the processing speed performance caused by waiting for the processing data at each processing unit.

Figure 12:
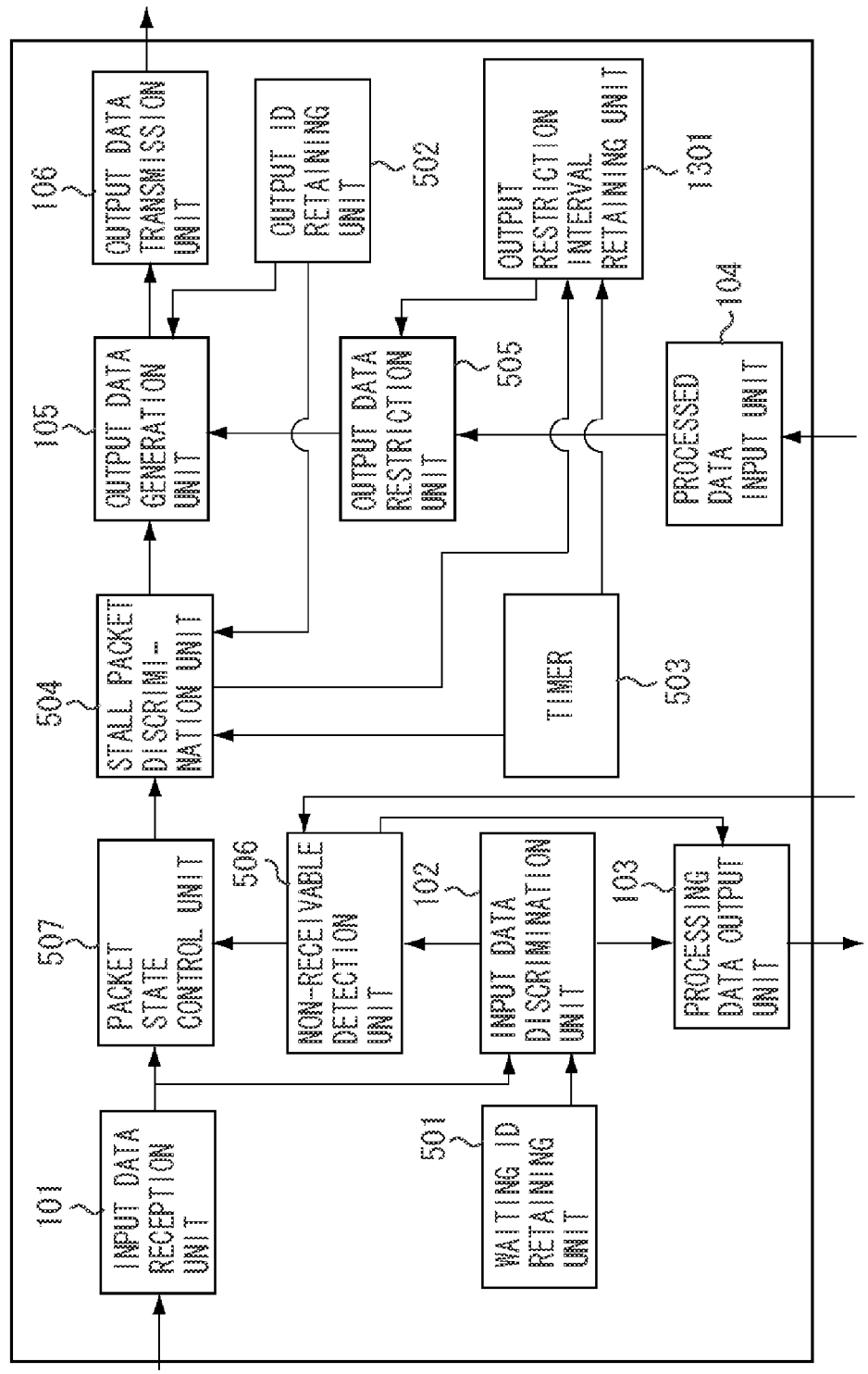
FIG. 12 is a schematic block diagram illustrating a configuration of the communication processing unit.

FIG. 12 illustrates a schematic configuration of another embodiment of the communication processing unit. A configuration having a similar function to that of the communication processing unit illustrated in FIGS. 4 and 11 has a same reference numeral, and description thereof will not be repeated.

As described above, there are various cases of the output restriction time when the stall is detected. A case is described where the data processing by the latter stage spends an inconstant processing time to communicate with an external memory or an external processing module and thus the data reception disable time is changed.

In such a case, if the data reception disable time has a certain statistic factor, the data output restriction time needs to be controlled to moderately follow the change of the data reception disable time.

In the configuration of the communication processing unit illustrated in FIG. 12, in addition to the configuration of FIG. 4, an output restriction time control unit is provided, which can dynamically change an instruction of an output restriction time 1301 according to a certain rule.

When the output data restriction unit 505 is informed by the stall packet discrimination unit 504, the output data restriction unit 505 restricts the data output only for the time instructed by the output restriction time 1301.

The output restriction time 1301 retains an output restriction time "TB" as an initial value, an increased time "TI" of the output restriction time when the stall packet is detected, and a decreased amount "TD" of the output restriction time when the stall packet is not detected for a certain time. Further, the output restriction time 1301 sets the output restriction time "T" to an initial value "TB" as the initial value of a value actually output as the output restriction time.

When the stall packet discrimination unit 504 notifies the output restriction time 1301 of the stall packet, the output restriction time 1301 adds "TI" to the output time "T". When the stall packet is continuously notified within a certain time, the output restriction time may be controlled according to a density of the stall packets in the ring bus, for example, the number of times of re-notifications of "TI" is added to the "T".

With this control, when the data is continuously output at a short interval, and when a large number of stalls are continuously generated, the output interval is increased to suppress the occurrence of the deadlock.

Typically, when the output restriction time period of the data is increased, a frequency for generating the stall is decreased. For example, when a very long data reception disable time is generated, if the output restriction time is not set long enough, the deadlock can be generated.

Therefore, the "TI" is set comparatively larger, and the "TD" is set smaller compared to the "TI", thereby stably controlling the output restriction time. Alternatively, the processing performance, the output restriction time may be controlled to set the "TI" smaller and the "TD" larger so that the processing performance is not decreased.

Further, the minimum restriction time "TM" may be set to control the output restriction time "T" not to be decreased to lower than the "TM". Thus, the deadlock caused by excessively shortening the minimum time can be avoided.

The "TI" and "TD" may not be previously specified and may be set to an appropriate value in the data processing unit, or a random value may be used. Furthermore, a known function may be used to statistically calculate the values of the "TI" and "TD".

As described above, according to the communication processing unit illustrated in FIG. 12, even when the data reception disable time of the processing unit is inconstant, the frequency for generating the stall may be suppressed to efficiently flow the data.

In the description of the above-described exemplary embodiment, the image processing apparatus is used as an example. However, the present invention is not limited to the image processing but can be also applied to information processing in which the processing such as the pipe-line processing is performed by a plurality of processing units in parallel.

The description is omitted in the above-described exemplary embodiment, the present invention enables each processing unit to operate in parallel and thus is suitable for a parallel operation apparatus (multi core processor) operating at a high speed. When a parallel operation is performed, it may be ideal that each processing unit distributes equal load. Thus, it is desirable that the data acquisition unit divides the input data into the packet (or a predetermined amount of data) having a predetermined length (bit length) so that the processing unit having an equal processing function can perform the parallel processing.

When each processing unit performs different processing, each processing unit preferably adjusts the packet length (data amount) so that a time period from processing the packet to outputting the packet becomes close to a predetermined time.

The information used for notification is referred to as the first bit and the second bit, but any information may be used so long as it can be processed into the packet and used for notification. In the exemplary embodiment described above, the valid flag for indicating that the packet is valid is used. Further, a specified node ID (e.g., "0") may be used as the invalid packet (equivalent to the valid flag "0") and a packet length may be shortened.

The data acquired from the external device may be input in a format of the packet that is used in the ring bus. Further, the processing unit interprets the packet and may be processed as it is.

The diagram of the schematic configuration of each unit in the data processing apparatus used in the above-described exemplary embodiments illustrates a relationship for connecting the circuits or the function units, but does not restrict a positional relationship or the number of the components. For example, in order to implement the present invention, three or more communication units (including input and output) may be needed, or two or more processing units may be needed.

The diagram of the schematic configuration of each unit in the data processing apparatus used in the above-described exemplary embodiments illustrates the relationships for connecting the circuits or the function units, but does not restrict a positional relationship or the number of the components. For example, a processing module may be formed as a separate chip, or a single chip. The processing unit and the communication unit may be configured similarly thereto. The configuration of the present invention may be formed as one chip.

In the above-described exemplary embodiments, processing modules are configured in a ring pattern topology, however, the present invention is not limited thereto. For example, even if the processing modules are configured in the bus pattern topology or in a mesh pattern, the present invention can be applied to all configurations in which a series of processing (pipeline processing) is divided and parallel processing is performed by a plurality of modules in order. Thus, transfer efficiency can be improved.

The exemplary embodiment described above only describes the settings of a single pipeline processing as an example, however, the present invention can be applied to a parallel processing unit performing a plurality types of pipeline processing by time-sharing processing. In this case, the format of the packet may be provided with a path discriminator for discriminating the pipeline processing to which the packet belongs. A setting of each module may be stored in each module for each pipeline processing. The register for discriminating the input packet for discriminating the input data and the register storing the ID to be added to the output packet need store the ID for each pipeline processing.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-060687 filed Mar. 13, 2009, which is hereby incorporated by reference herein in its entirety.

What is claimed is:

1. A data processing apparatus including a plurality of processing circuits communicably connected in a ring bus and at least two processing circuits among the plurality of processing circuits configured to perform data sequential processing in predetermined order, a first processing circuit unit and a second processing circuit being used for the sequential processing,
the first processing circuit comprising:
a reception circuit configured to receive data;
an identification circuit configured to identify whether the received data is to be processed by the first processing circuit; and
a transmission circuit configured to, if the first processing circuit is in a first state where the first processing circuit does not process the data to be processed identified by the identification circuit of the first processing circuit, set additional information with the data to be processed by the first processing circuit, wherein the additional information indicates the first processing circuit is in the first state, and transmit the data with the additional information to the ring bus; and
the second processing circuit comprising:
a reception circuit configured to receive data from the ring bus;
a detection circuit configured to detect, based on the data with additional information, whether the data received by the reception circuit of the second processing circuit is processed and transmitted by the second processing circuit and transmitted with the additional information by the first processing circuit without being processed by the first processing circuit; and
a control circuit configured to, if the detection circuit detects that the data received by the reception circuit of the second processing circuit is processed and transmitted by the second processing circuit and transmitted with the additional information by the first processing circuit without being processed by the first processing circuit, restrict the second processing circuit from outputting data for data to be processed by the first processing circuit, processed by the second processing circuit, to the ring bus,
wherein the first processing circuit is configured to perform processing subsequent to the second processing circuit in the predetermined order of the sequential processing.

2. The data processing apparatus according to claim 1, wherein the control circuit does not restrict the second processing circuit from outputting the data with the additional information detected by the detection circuit that the first processing circuit is in the first state, output the data with additional information without changing, and the control circuit restricts the second processing circuit from outputting data processed by the second processing circuit, wherein the data which the second processing circuit is restricted from outputting is data subsequent to the data with the additional information detected by the detection circuit that the first processing circuit is in the first state, and
wherein the data transmitted by the second processing circuit is processed subsequently by the first processing circuit.

3. The data processing apparatus according to claim 1, wherein the control circuit does not restrict the second processing circuit from outputting data other than the data which is processed by the second processing circuit.

4. The data processing apparatus according to claim 1, wherein the transmission circuit sets a first bit to the data as the additional information.

5. The data processing apparatus according to claim 1, wherein a second bit is set to the data, and wherein the second bit indicates that the data is valid.

6. The data processing apparatus according to claim 4, wherein the detection circuit detects that the first processing circuit is in the first state based on the first bit, which is added by the first processing circuit.

7. The data processing apparatus according to claim 4, wherein, if the first processing circuit is about to become a second state where the first processing circuit processes data, the transmission circuit sets a third bit indicating that the first processing circuit is in the second state.

8. The data processing apparatus according to claim 1, wherein the second processing circuits further comprises:
a retaining circuit configured to retain a first identification (ID) unique to the second processing circuit among the plurality of the processing circuits,
wherein a transmission circuit transmits a data processed by the second processing circuit with ID the same as the first ID,
wherein the detection circuit compares an ID of the received data received by the reception circuit of the second processing circuit with the first ID, and
wherein the detection circuit is configured to determine that the received data is data, which is processed and transmitted by the second processing circuit and returned as processing for the data is suspended by the first processing circuit, in a case where the detection circuits detect that the ID of the received data is identical to the first ID and the received data is with the additional information.

9. The data processing apparatus according to claim 1, wherein, if the additional information is detected, the control circuit restricts the second processing circuit from outputting data for processing the first processing circuit, which is in the first state, during a predetermined time.

10. The data processing apparatus according to claim 8, wherein the second processing circuit further comprises:
a timer configured to measure a period taken for a circulation of the packet transmitted by one of the plurality of processing circuits in the ring bus, wherein, when the additional information is detected, the control circuit restricts outputting data for processing by the first processing circuit, which is in the first state, during a time which is a multiple of the period acquired by the timer.

11. The data processing apparatus according to claim 1, wherein the second processing circuit further comprises:
a timer configured to measure a predetermined period and a register configured to retain an initial value "TB" of an output restriction time and an increased time "TI" thereof and a decreased time "TD" thereof,
wherein the control circuit performs restriction and control based on a time calculated using the initial value "TB", the increased time "TI", and the decreased time "TD".

12. The data processing apparatus according to claim 1, wherein the transmission circuit transmits a data packet and a command packet, and a processing circuit which receives the data packet and the command packet processes data acquired from the data packet according to a command acquired from the command packet.

13. A data processing device communicably connected with a first processing device in a ring bus and configured to process data, which is processed in order, the data processing device comprising:
a reception circuit configured to receive a packet;
an identification circuit configured to identify whether data included in the received packet is to be processed;
a data processing circuit configured to process data that is identified to be processed by the identification circuit;
a transmission circuit configured to transmit a packet to the ring bus, wherein the transmission circuit transmits a packet including data to be processed and additional information which indicates that the first processing device is in a state where the first processing device does not process the data to be processed;
a detection circuit configured to detect, based on the additional information in the packet, that the packet including the data processed by the data processing circuit and transmitted by the transmission circuit, processing of which is suspended as the first processing circuit is in the state, circulating at least one time in the ring bus; and
a control circuit configured to, if the detection circuit detects that the packet including data processed by the data processing device and transmitted by the transmission circuit is circulated and returned as processing of the packet is suspended due to the first processing circuit being unit is in the state, restrict outputting of the processed data to the ring bus.

14. A data processing apparatus including a plurality of processing circuits communicably connected in a ring bus and at least two processing circuits among the plurality of processing circuits configured to perform data sequential processing in predetermined order, a first processing circuit and a second processing circuit being used for the sequential processing,
the first processing circuit comprising:
a transmission circuit configured to, if the first processing circuit is in a first state where the first processing circuit does not process the data included in a packet acquired from the ring bus, wherein the data is to be processed by the first processing circuit, transmit to the ring bus the packet including additional information and the data for the first processing circuit, wherein the additional information indicates that the first processing circuit is in the first state;
the second processing circuit comprising:
a reception circuit configured to receive data from the ring bus;
a detection circuit configured to detect, based on the data with additional information, whether the data received by the reception circuit of the second processing circuit is processed and transmitted by the second processing circuit and transmitted with the additional information by the first processing circuit without being processed by the first processing circuit; and
a control circuit configured to, if the detection circuit detects that the data received by the reception circuit of the second processing circuit is data that is processed and transmitted by the second processing circuit and transmitted with the additional information by the first processing circuit without being processing by the first processing circuit is in the first state, restrict the second processing circuit from outputting data processed by the second processing circuit to the ring bus.

15. A non-transitory computer readable storage medium storing a program causing each of a plurality of processing circuits communicably connected in a ring bus to execute a method, the method comprising:
a transmitting step that a first processing circuit, which is one of the plurality of processing circuits, transmits received data with additional information, if the first processing circuit is in a first state where the first processing circuit does not process data to be processed by the first processing circuit included in a packet acquired from the ring bus, wherein the additional information indicates that the first processing circuit is in the first state;
a detecting step that a second processing circuit, which is one of the plurality of processing circuits and processes data preceding to the first processing circuit, detects, based on the additional information in the packet having data processed by the second processing circuit, transmitted by the second processing circuit and circulating at least one time in the ring bus, wherein the packet is transmitted by the first processing circuit, that the first processing circuit is in the first state; and
a restricting step that the second processing circuit restricts, if the detecting step detects that the first processing circuit is in the first state, outputting data processed by the second processing circuit and to be processed in the first processing circuit to the ring bus.

16. A data processing method executed by at least one of a plurality of processing circuits communicably connected in a ring bus, the method comprising:
a transmitting step that a first processing circuit, which is one of the plurality of processing circuits, transmits received data with additional information, if the first processing circuit is in a first state where the first processing circuit does not process the received data to be processed by the first processing circuit which is acquired from the ring bus, wherein the additional information indicates that one of the plurality of processing circuits is in the first state;
a detecting step that a second processing circuit, which is one of the plurality of processing circuits and processes data preceding to the first processing circuit, detects, based on the additional information in the packet having data processed by the second processing circuit, transmitted by the second processing circuit and circulating at least one time in the ring bus, wherein the packet is transmitted by the first processing circuit, that the first processing circuit is in the first state; and a restricting step that the second processing circuit restricts, if the detecting step detects that the first processing circuit is in the first state, outputting data processed by the second processing circuit and to be processed in the first processing circuit to the ring bus.

17. The data processing method according to claim 16, wherein the second processing circuit does not restrict, in the restricting step, outputting of the data with the additional information detected by the detecting step that the additional information with the data indicates that the first processing circuit is in the first state.

18. The data processing method according to claim 16, wherein the second processing circuit does not restrict outputting of data processed by another processing circuit in the restricting step.

19. The data processing method according to claim 16, wherein the first processing circuit sets a first bit to unprocessed data as the additional information in the transmitting step.

20. The data processing method according to claim 19, wherein the detecting step detects that the first processing circuit is in the first state based on the first bit, which is added by the first processing circuit, in the detecting step.

21. The data processing method according to claim 19, wherein, if the first processing circuit is about to become a second state where the first processing circuit processes data, the first processing circuit sets a third bit in the transmitting step, and the third bit indicating that the first processing circuit is in the second state.

22. The data processing method according to claim 16, wherein if the additional information is detected, the restricting step restricts the second processing circuit from outputting data for the first processing circuit, which is in the first state, during a predetermined time.

23. The data processing method according to claim 22, wherein the restricting step makes the predetermined time longer if the additional information is detected, and wherein the restricting step shortens the predetermined time if the additional information is not detected.

24. The data processing method according to claim 16, wherein the first processing circuit and the second processing circuit transmit a data packet and a command packet, and the first processing circuit and the second processing circuit process data acquired from the data packet according to a command acquired from the command packet.

25. A data processing method executed by a data processing device communicably connected with a first processing device in a ring bus and configured to process data, which is processed in order, the method comprising:

a receiving step that receives a packet;

an identification step that identifies whether data included in the received packet is to be processed;

a data processing step that processes data that is identified to be processed by the identification step;

a transmission step that transmits a packet to the ring bus, wherein the transmission step transmits a packet including data to be processed and additional information which indicates that the first processing device is in a state where the first processing device does not process the data to be processed;

a detecting step that a detecting circuit detects, based on the additional information in the packet, that the packet including the data processed by the data processing step and transmitted by the transmission step, processing which is suspended as the first processing device is in the state, circulating at least one time in the ring bus; and a restricting step that a control circuit restricts, if the detection circuit unit detects that the packet including data processed by the data processing step and transmitted by the transmitting step is circulated and returned as processing of the packet is suspended due to the first processing device being in the state, a second processing device from outputting data for processing in the first processing device to the ring bus.

26. The data processing apparatus according to claim 9, wherein, if the additional information is detected, the control circuit restricts outputting data for a longer time than a case that the additional information is not detected.

27. The data processing apparatus according to claim 9, wherein the control circuit makes the predetermined time longer if the additional information is detected, and the control circuit shortens the predetermined time if the additional information is not detected.

28. An image processing system comprising:
the data processing apparatus according to claim 1; and
a control circuit configured to control the data processing apparatus.

29. The data processing device according to claim 13, wherein the control circuit restricts outputting of data processed by the first processing device.

30. The data processing device according to claim 13, wherein the control circuit outputs a packet based on which the state is detected.

31. The data processing device according to claim 13, wherein the control circuit does not restrict outputting of an empty packet or a valid packet to be processed by at least one other processing device.

32. A data processing method executed by a data processing apparatus including a plurality of processing circuits communicably connected in a ring bus and at least two processing circuits among the plurality of processing circuits configured to perform data sequential processing in predetermined order, a first processing circuit and a second processing circuit being used for the sequential processing, the method comprising:

a first reception step that the first processing circuit receives data;

an identification step that identifies whether the received data is to be processed by the first processing circuit;

a transmission step that the first processing circuit, if the first processing circuit is in a first state where the first processing circuit does not process the data to be processed identified by the identification step, sets additional information with the data to be processed by the first processing circuit, wherein the additional information indicates the first processing circuit is in the first state, and transmits the data with the additional information to the ring bus;

a second reception step that the second processing circuit receives data from the ring bus;

a detection step that the second processing circuit detects, based on the data with additional information, whether the data received by the second reception step is processed and transmitted by the second processing circuit and transmitted with the additional information by the transmission step without being processed by the first processing circuit; and a control step that the second processing circuit, if the detection step detects that the data received by the second reception step and transmitted by the transmitting step and transmitted with the additional information by the first processing circuit, restricts the second processing circuit unit from outputting data for the first processing circuit, processed by the second processing circuit, to the ring bus, wherein the first processing circuit performs processing subsequent to the second processing circuit in the predetermined order of the sequential processing.

33. A non-transitory computer readable storage medium storing a program causing a data processing apparatus to execute a method, the data processing apparatus including a plurality of processing circuits communicably connected in a ring bus and at least two processing circuits among the plurality of processing circuits configured to perform data sequential processing in predetermined order, a first processing circuit and a second processing circuit being included in the plurality of processing circuits, the method comprising:

a first reception step that the first processing circuit receives data;

an identification step that identifies whether the data received by the first reception step is to be processed by the first processing circuit;

a transmission step that the first processing circuit, if the first processing circuit is in a first state where the first processing circuit does not process the data to be processed identified by the identification step, sets additional information with the data to be processed by the first processing circuit, wherein the additional information indicates the first processing circuit is in the first state, and transmits the data with the additional information to the ring bus;

a second reception step that the second processing circuit receives unit acquires data from the ring bus;

a detection step that the second processing circuit detects, based on the data with additional information, whether the data received by the second reception step is processed and transmitted by the second processing circuit and transmitted with the additional information by the transmitting step without being processed by the first processing circuit, wherein the data with additional information is acquired by the reception step, that the first processing circuit is in the first state; and a control step that the second processing circuit, if the detection circuit unit detects that the data received by the second reception step is processed and transmitted by the second processing circuit and transmitted with the additional information by the first processing circuit without being processed by the first processing circuit, restricts the second processing circuit from outputting data to be processed by the first processing circuit, processed by the second processing circuit, to the ring bus, wherein the first processing circuit performs processing subsequent to the second processing circuit in the predetermined order of the sequential processing.

34. A data processing method executed by a data processing device communicably connected with a first processing device in a ring bus and configured to process data, which is processed in order, the method comprising:

a reception step that receives a packet;

an identification step that identifies whether data included in the packet received by the reception step is to be processed;

a data processing step that processes data included in the packet that is identified to be processed by the identification step;

a transmission step that transmits a packet to the ring bus, wherein the transmission step transmits a packet including data to be processed and additional information which indicates that the first processing device is in a state where the first processing device does not process the data to be processed;

a detection step that detects that the packet including the data processed by the data processing step and transmitted by the transmission step, processing of which is suspended as the first processing device is in the state based on the packet; and a control step that, if the detection step detects that the packet including data processed by the data processing step and transmitted by the transmission step is circulated and returned as processing of the packet is suspended due to the first processing device being in the state, restricts outputting of the processed data for the first processing device to the ring bus.

35. A non-transitory computer readable storage medium storing a program causing a data processing device communicably connected with a first processing device in a ring bus and configured to process data, which is processed in order, to execute a method comprising:

a reception step that receives a packet;

an identification step that identifies whether data included in the packet received by the reception step is to be processed;

a data processing step that processes data included in the packet that is identified to be processed by the identification step;

a transmission step that transmits a packet to the ring bus, wherein the transmission step transmits a packet including data to be processed and additional information which indicates that the first processing device is in a state where the first processing device does not process the data to be processed;

a detection step that detects, based on the additional information in the packet circulating at least one time in the ring bus, wherein the packet is transmitted by the first processing device, that the packet including the data processed by the data processing step and transmitted by the transmission step, processing of which is suspended as the first processing device is in the state based on the packet; and a control step that, if the detection step detects that the packet including data processed by the data processing step and transmitted by the transmission step is circulated and returned as processing of the packet is suspended due to the first processing device being in the state, restricts outputting of the processed data to the ring bus.

36. A data processing apparatus including a plurality of processing circuits communicably connected in a ring pattern and at least two processing circuits among the plurality of processing circuits configured to perform data sequential processing in predetermined order, a first processing circuit and a second processing circuit being used for the sequential processing, the first processing circuit comprising:

a reception circuit configured to receive data;

an identification circuit configured to identify whether the received data is to be processed by the first processing circuit; and a transmission circuit configured to, if the first processing circuit is in a first state where the first processing circuit does not process the data to be processed identified by the identification circuit, set additional information with the data received by the reception circuit indicating to be processed by the first processing circuit, wherein the additional information indicates the first processing circuit is in the first state, and transmit the data with the additional information; and the second processing circuit comprising:

a reception circuit configured to receive data;

a detection circuit configured to detect, based on the additional information with the data, wherein the data is processed and transmitted by the second processing circuit and transmitted with the additional information by the first processing circuit without being processed by the first processing circuit, wherein the data with additional information is received by the reception circuit of the second processing circuit, whether the data received by the reception circuit of the second processing circuit is processed and transmitted by the second processing circuit and transmitted with the additional information by the first processing circuit without being processed by the first processing circuit, wherein the additional information with the data transmitted by the first processing circuit, which the detection circuit detects is in the first state, circulates in the ring bus;

a control circuit configured to, if the detection circuit detects that the data received by the reception circuit of the second processing circuit is processed and transmitted by the second processing circuit and transmitted with the additional information by the first processing circuit without being processed by the first processing circuit, restrict the second processing circuit from outputting data for the to be processed by the first processing circuit, processed by the second processing circuit, wherein the data which the second processing circuit is restricted from outputting is a part of data to be output after the data with the additional information detected by the detection circuit that the additional information indicates that the first processing circuit is in the first state, wherein the first processing circuit is configured to perform processing subsequent to the second processing circuit in the predetermined order of the sequential processing.

37. A data processing method executed by a data processing apparatus including a plurality of processing circuits communicably connected in a ring bus and configured to perform data sequential processing in predetermined order, a first processing circuit and a second processing circuit being used for the sequential processing, the method comprising:

in the first processing circuit:

receiving acquiring data in the first processing circuit;

identifying whether the data received in the first processing circuit is to be processed by the first processing circuit;

if the first processing circuit is in a first state where the first processing circuit does not process the identified data to be processed, setting additional information with the data received in the first processing circuit indicating the first processing circuit is in the first state and transmit the data with the additional information;

in the second processing circuit;

receiving acquiring data in the second processing circuit;

detecting, based on the additional information with the data, wherein the data is processed and transmitted by the second processing circuit and transmitted with the additional information by the first processing circuit without being processed by the first processing circuit, wherein the data with additional information is received by the second processing circuit, whether the data received by the second processing circuit is processed and transmitted by the second processing circuit and transmitted with the additional information without being processed by the first processing circuit, and wherein the additional information with the data transmitted by the first processing circuit, which the detecting detects is in the first state, circulates in the ring bus; and if the detecting detects that the data received by the second processing circuit is processed and transmitted by the second processing circuit and transmitted with the additional information by the first processing circuit without being processed by the first processing circuit, restrict the second processing circuit from outputting data for the to be processed by the first processing circuit, processed by the second processing circuit, wherein the data which the second processing circuit is restricted from outputting is a part of data to be output after the data with the additional information detected by the detection circuit that the additional information indicates that the first processing circuit is in the first state, wherein the first processing circuit performs processing subsequent to the second processing circuit in the predetermined order of the sequential processing.

38. A data processing apparatus including at least a first processing circuit and a second processing circuit, the data processing apparatus comprising:

a first communication circuit configured to connect with the first processing circuit and a ring bus and set, if the first processing circuit connected with the first communication circuit is in a first state where the first processing circuit does not process a first data to be processes by the first processing circuit wherein the first data output from the second processing circuit, additional information indicating the first processing circuit is in the first state with data and transmit the data with the additional information to the ring bus;

a second communication circuit configured to connect with the second communication circuit and the ring bus and restrict outputting data for the first processing circuit, processed by the second processing circuit connected with the second communication circuit, to the ring bus in case where the data output by the first communication circuit with the additional information, wherein the data was processed by the second processing circuit and transmitted by the second processing circuit, is received via the ring bus.

39. A data processing method executed by a data processing apparatus including at least a first communication circuit and a second communication circuit, the data processing method comprising:

in the first communication circuit:

connecting with a first processing circuit and a ring bus and setting, if the first processing circuit connected with the first communication circuit is in a first state where the first processing circuit does not process a first data to be processed by the first processing circuit wherein the first data output from a second processing circuit, additional information indicating the first processing circuit is in the first state with data and transmitting the data with the additional information to the ring bus;

in the second communication circuit:

connecting with a second processing circuit and the ring bus and restricting outputting data for the first processing circuit, processed by the second processing circuit connected with the second communication circuit, to the ring bus in case where the data output by the first communication circuit with the additional information, wherein the data was processed by the second processing circuit and transmitted by the second processing circuit, is received via the ring bus.

* * * * *